US011299265B2

(12) United States Patent
Schmaling et al.

(10) Patent No.: US 11,299,265 B2
(45) Date of Patent: Apr. 12, 2022

(54) ROTOR BLADE FOLDING SYSTEM

(71) Applicant: Lockheed Martin Corporation, Bethesda, MD (US)

(72) Inventors: David N. Schmaling, Southbury, CT (US); Andrew C. Goodwin, Shelton, CT (US); Yair Preiss, Stamford, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 245 days.

(21) Appl. No.: 16/426,787

(22) Filed: May 30, 2019

(65) Prior Publication Data
US 2020/0377206 A1    Dec. 3, 2020

(51) Int. Cl.
*B64C 27/50* (2006.01)
*B64C 27/48* (2006.01)
*B64C 27/10* (2006.01)

(52) U.S. Cl.
CPC .............. *B64C 27/50* (2013.01); *B64C 27/10* (2013.01); *B64C 27/48* (2013.01)

(58) Field of Classification Search
CPC ......... B64C 27/48; B64C 27/50; B64C 27/10; B64C 11/28
See application file for complete search history.

(56) References Cited

U.S. PATENT DOCUMENTS

| 2,405,777 | A | * | 8/1946 | Buivid | B64C 27/50 416/143 |
| 2,658,576 | A | * | 11/1953 | Mosinskis | B64C 27/50 416/106 |
| 2,830,669 | A | * | 4/1958 | Klockner | B64C 27/54 416/163 |
| 3,026,942 | A | * | 3/1962 | Cresap | B64C 27/54 416/114 |
| 3,310,120 | A | * | 3/1967 | Vacca | B64C 27/50 416/103 |
| 3,652,185 | A | * | 3/1972 | Cresap | B64C 27/32 416/134 R |
| 3,942,910 | A | * | 3/1976 | Snyder | B64C 27/32 416/141 |
| 4,252,504 | A | * | 2/1981 | Covington | B64C 27/50 416/143 |
| 4,257,739 | A | * | 3/1981 | Covington | B64C 27/35 416/134 A |
| 4,427,340 | A | * | 1/1984 | Metzger | B64C 27/51 416/134 A |
| 4,828,458 | A | * | 5/1989 | Pariani | B64C 27/33 416/123 |

(Continued)

*Primary Examiner* — David E Sosnowski
*Assistant Examiner* — Wayne A Lambert
(74) *Attorney, Agent, or Firm* — Foley & Lardner LLP

(57) ABSTRACT

A rotor blade attachment assembly for use with a rotor hub to which a rotor blade assembly is connected includes a hub extender having an inboard end and an outboard end. The inboard end of the hub extender is configured to form a connection with the rotor hub. A blade fold axis about which the rotor blade rotates relative to the rotor hub is defined at the connection. An inboard bearing is mounted within an interior of the hub extender adjacent the inboard end and an outboard bearing is mounted within the interior of the hub extender adjacent the outboard end. A tension torsion strap is operably coupled to the inboard bearing and the outboard bearing.

19 Claims, 11 Drawing Sheets

(56) References Cited

U.S. PATENT DOCUMENTS

| | | | | |
|---|---|---|---|---|
| 5,059,094 A * | 10/1991 | Robinson | B64C 27/33 | 416/134 A |
| 5,228,834 A * | 7/1993 | Yamamoto | B64C 27/33 | 416/131 |
| 5,951,252 A * | 9/1999 | Muylaert | B64C 27/39 | 416/140 |
| 7,530,790 B2 * | 5/2009 | Cabrera | B64C 27/10 | 416/134 A |
| 7,585,153 B1 * | 9/2009 | Schmaling | B64C 27/48 | 416/129 |
| 7,695,249 B2 * | 4/2010 | Krauss | B64C 27/58 | 416/134 A |
| 7,841,829 B2 * | 11/2010 | Schmaling | B64C 27/10 | 416/1 |
| 9,169,011 B2 * | 10/2015 | Hunter | B64C 27/58 | |
| 10,450,059 B2 * | 10/2019 | Cravener | B64C 27/33 | |
| 10,569,869 B2 * | 2/2020 | Paulson | B64C 3/56 | |
| 10,703,460 B2 * | 7/2020 | Paulson | B64C 27/30 | |
| 10,703,461 B2 * | 7/2020 | Cravener | B64C 3/56 | |
| 10,703,469 B2 * | 7/2020 | Paulson | B64C 29/0033 | |
| 2008/0112808 A1 * | 5/2008 | Schmaling | B64C 27/35 | 416/134 A |
| 2017/0217580 A1 | 8/2017 | Kirchen et al. | | |

\* cited by examiner

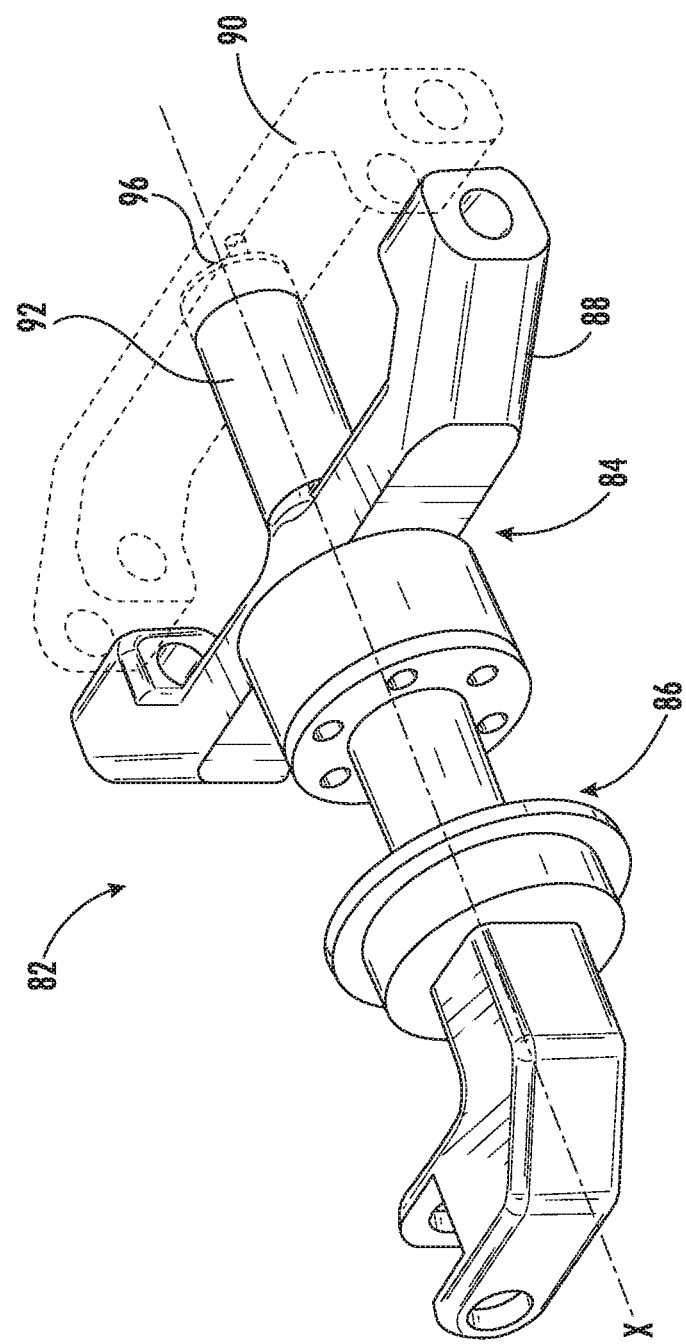

ROTOR BLADE FOLDING SYSTEM

BACKGROUND

The embodiments disclosed herein relate to a rotor assembly of a rotary wing aircraft, and more particularly to a rotor assembly operable to fold about a blade fold axis.

The flight capabilities of rotary-wing aircrafts make them effective for a wide variety of missions; however, operation of rotary-wing aircraft in certain environments may be limited by the overall structural envelopes thereof. The radial dimensions of a rotary-wing aircraft main rotor assembly results in a rotary-wing aircraft having relatively large structural envelopes which may impact its utility in some environments. For example, space on a ship or vessel is generally at a premium and the structural envelope of a rotary wing aircraft may require a significant allocation of such limited space. Furthermore, strategic and tactical considerations in the military utilization of rotary-wing aircrafts has led to a requirement for rotary-wing aircrafts having main rotor assemblies that may be readily reconfigured for rapid deployment, routine transport, and/or stowage by reducing the structural envelope.

One way to reduce the structural envelope of rotary-wing aircraft to facilitate rapid deployment, routine transport, stowage, and reduce the vulnerability thereof to environmental conditions is to design the main rotor assembly so that the main rotor blades fold relative to the main rotor hub. However, existing blade fold systems are cumbersome and are susceptible to drag, thereby decreasing the efficiency of the rotary wing aircraft in flight.

BRIEF DESCRIPTION

According to an embodiment, a rotor blade attachment assembly for use with a rotor hub to which a rotor blade assembly is connected includes a hub extender having an inboard end and an outboard end. The inboard end of the hub extender is configured to form a connection with the rotor hub. A blade fold axis about which the rotor blade rotates relative to the rotor hub is defined at the connection. An inboard bearing is mounted within an interior of the hub extender adjacent the inboard end and an outboard bearing is mounted within the interior of the hub extender adjacent the outboard end. A tension torsion strap is operably coupled to the inboard bearing and the outboard bearing.

In addition to one or more of the features described above, or as an alternative, in further embodiments the inboard end includes a clevis having an upper portion and a lower portion, the connection being formed at both the upper portion and the lower portion.

In addition to one or more of the features described above, or as an alternative, in further embodiments at least one of the inboard bearing and the outboard bearing is an elastomeric bearing.

In addition to one or more of the features described above, or as an alternative, in further embodiments the hub extender is formed from a composite material.

In addition to one or more of the features described above, or as an alternative, in further embodiments a cross-sectional area of the hub extender reduces over a length of the hub extender.

In addition to one or more of the features described above, or as an alternative, in further embodiments comprising a pitch control coupling mounted to the inboard bearing, wherein the pitch control coupling is rotatable about a pitch axis.

In addition to one or more of the features described above, or as an alternative, in further embodiments the blade fold axis is located inboard of the inboard bearing.

In addition to one or more of the features described above, or as an alternative, in further embodiments comprising an anchor located within the interior of the hub extender, the anchor coupling the inboard bearing to a first end of the tension torsion strap.

In addition to one or more of the features described above, or as an alternative, in further embodiments comprising an outboard bearing bracket located at least partially within the interior of the hub extender, the outboard bearing bracket coupling the outboard bearing to a second end of the tension torsion strap.

According to another embodiment, a rotor assembly includes a rotor hub rotatable about an axis and a plurality of rotor blade assemblies connected to the rotor hub. Each of the plurality of rotor blade assemblies includes a torque tube and at least one of the plurality of rotor blade assemblies includes a blade attachment assembly. The blade attachment assembly includes a rigid hub extender having configured to form a connection with the rotor hub and a blade fold axis of the rotor blade assembly is defined at the connection. At least one bearing is mounted within an interior of the hub extender and a tension torsion strap is mounted within the interior of the hub extender. The tension torsion strap is rotatable about a pitch axis of the at least one rotor blade assembly and is translationally fixed relative to the pitch axis of the at least one rotor blade assembly.

In addition to one or more of the features described above, or as an alternative, in further embodiments the rotor hub further comprises a plurality of hub arms and the connection is formable between an inboard end of the hub extender and one of the plurality of hub arms.

In addition to one or more of the features described above, or as an alternative, in further embodiments the plurality of hub arms includes at least one hub arm having a clevis including an opening, and a portion of the inboard end of the hub extender is receivable within the opening.

In addition to one or more of the features described above, or as an alternative, in further embodiments comprising a hub fairing mounted to the rotor hub.

In addition to one or more of the features described above, or as an alternative, in further embodiments the hub fairing includes a cut out adjacent the at least one of the plurality of rotor blade assemblies that is foldable about the blade fold axis.

In addition to one or more of the features described above, or as an alternative, in further embodiments the blade attachment assembly further comprises a pitch control assembly rotatable about the pitch axis.

In addition to one or more of the features described above, or as an alternative, in further embodiments the pitch control assembly is operable to rotate the torque tube about the pitch axis.

In addition to one or more of the features described above, or as an alternative, in further embodiments the pitch control assembly further comprises a horn spindle coupling rotationally mounted to the rotor hub and a blade pitch control coupling mounted to the torque tube, wherein the blade pitch control coupling rotationally engages the horn spindle coupling when the blade attachment assembly is in the flight position.

In addition to one or more of the features described above, or as an alternative, in further embodiments an interface between the blade pitch control coupling and the horn spindle coupling includes a toothed interlock that rotationally locks the blade pitch control coupling to the horn spindle coupling.

In addition to one or more of the features described above, or as an alternative, in further embodiments the at least one bearing includes an inboard bearing mounted adjacent an inboard end of the hub extender and an outboard bearing mounted adjacent an outboard end of the hub extender, and the tension torsion strap is operably coupled to both the inboard bearing and the outboard bearing.

BRIEF DESCRIPTION OF THE DRAWINGS

The following descriptions should not be considered limiting in any way. With reference to the accompanying drawings, like elements are numbered alike:

FIG. 12 is a perspective view of a pitch control assembly of a blade attachment assembly according to an embodiment.

DETAILED DESCRIPTION

A detailed description of one or more embodiments of the disclosed apparatus and method are presented herein by way of exemplification and not limitation with reference to the Figures.

Figure 1:
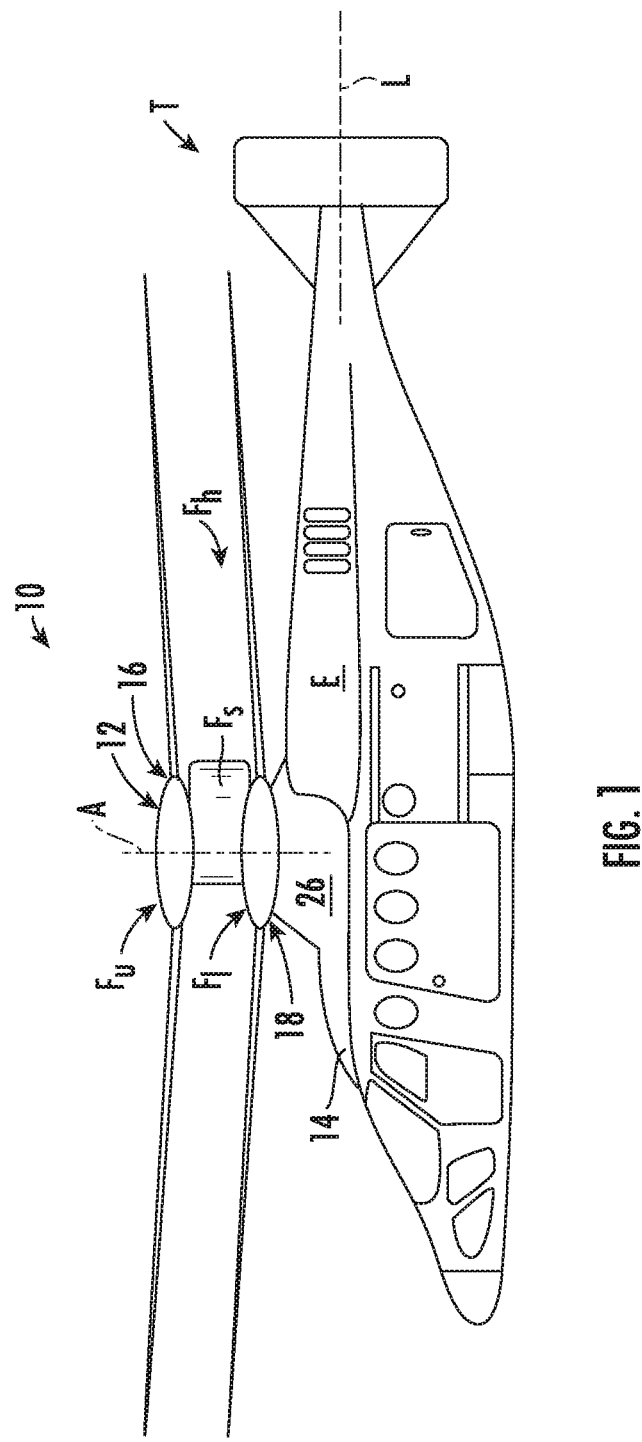
FIG. 1 is a perspective view of an example of a rotary wing aircraft.

FIG. 1 illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system T which provides translational thrust generally parallel to an aircraft longitudinal axis L. Although a particular aircraft configuration is illustrated in the disclosed embodiment, other counter-rotating, coaxial rotor systems will also benefit from the present invention.

A main gearbox 26, which may be located above the aircraft cabin, drives the rotor system 12. The translational thrust system T may be driven by the same main gearbox 26 which drives the rotor system 12. The main gearbox 26 is driven by one or more engines (illustrated schematically at E). As shown, the main gearbox 26 may be interposed between the gas turbine engines E, the rotor system 12 and the translational thrust system T.

Figure 2:
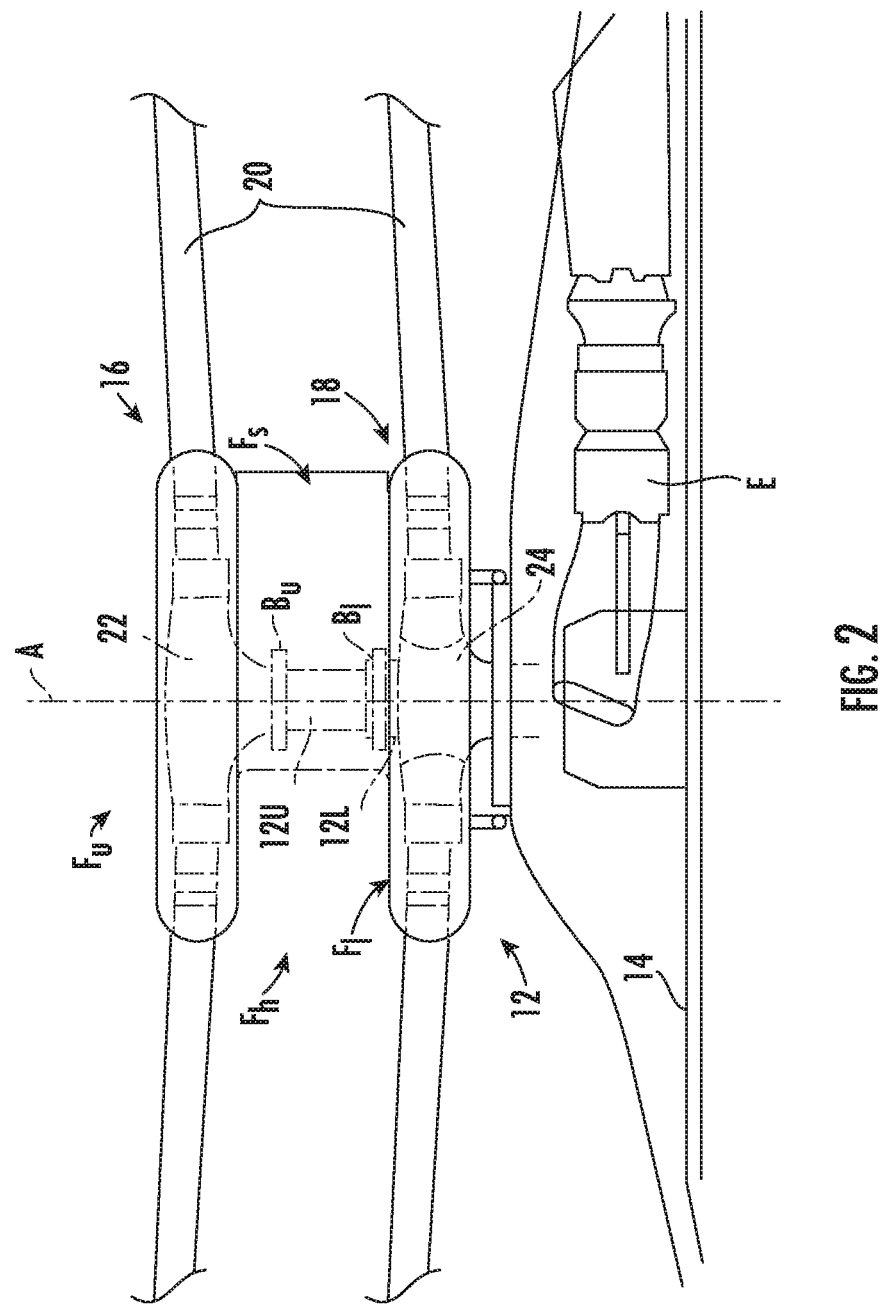
FIG. 2 is a detailed view of a rotor system of the rotary wing aircraft of FIG. 1.

Referring to FIG. 2, the dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22, 24 for rotation about a rotor axis of rotation A. A plurality of the main rotor blade assemblies 20 project radially outward from the hub assemblies 22, 24. While eight assemblies 20 are shown, it is understood that other numbers of number of main rotor blade assemblies 20 may be used with the rotor system 12.

In an embodiment, the rotor system 12 also includes a rotor hub fairing system Fh generally located between and around the upper and lower rotor systems 16, 18 such that the rotor hub assemblies 22, 24 are at least partially contained therein. The rotor hub fairing system Fh preferably includes an upper hub fairing Fu, a lower hub fairing Fl.

Figure 3:
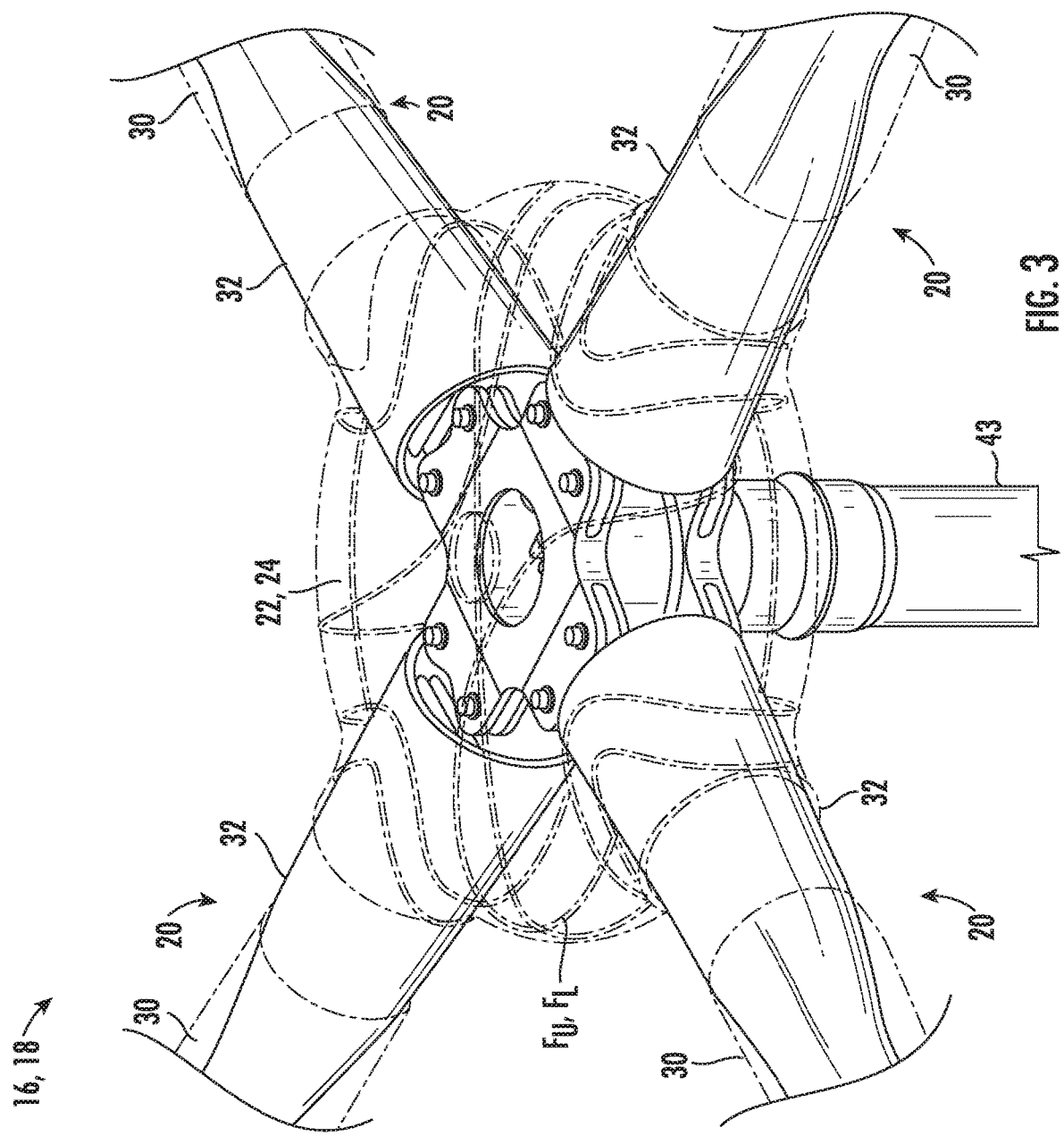
FIG. 3 is a perspective view of a portion of a rotor system in an in-flight position according to an embodiment.
Figure 4:
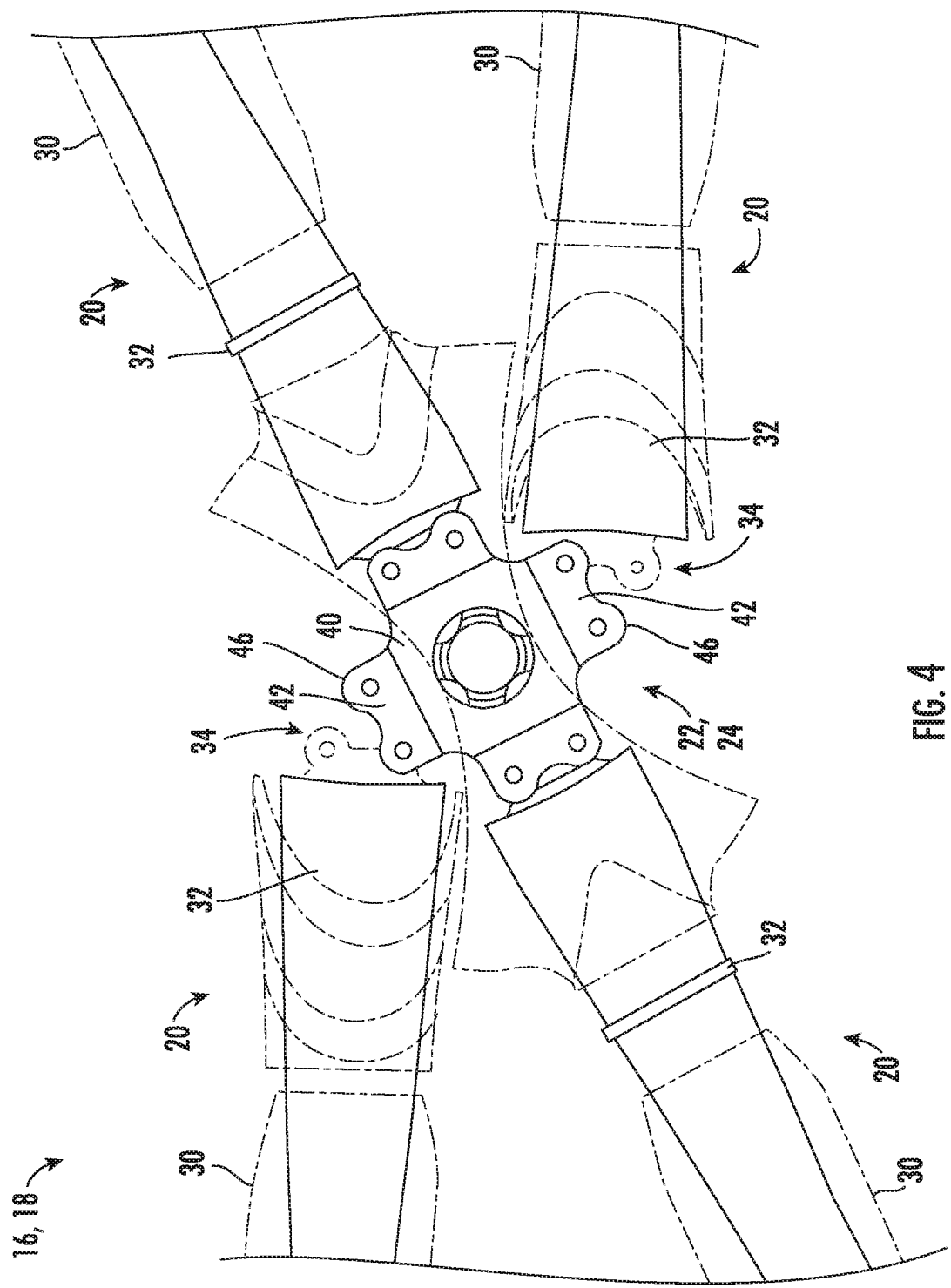
FIG. 4 is a perspective view of a portion of a rotor system in a stowed position according to an embodiment.

Referring now to FIGS. 3 and 4, at least one of the rotor blade assemblies 20 of the rotor system 12 includes a rotor blade 30, a rotor blade spindle, also referred to herein as a torque tube 32, and a blade attachment assembly 34 for mounting the rotor blade assembly 20 to a rotor hub assembly, such as rotor hub assembly 22 or 24 for example. In the illustrated, non-limiting embodiment, the main rotor system 12 is a rigid rotor system. The blade attachment assembly 34, to be described in more detail below, allows for movement of one or more of the rotor blade assemblies 20 relative to the rotor hub assembly 22, 24 between an extended position (FIG. 3) for operation of the aircraft and a collapsed position (FIG. 4) for storage of the aircraft.

Figure 5:
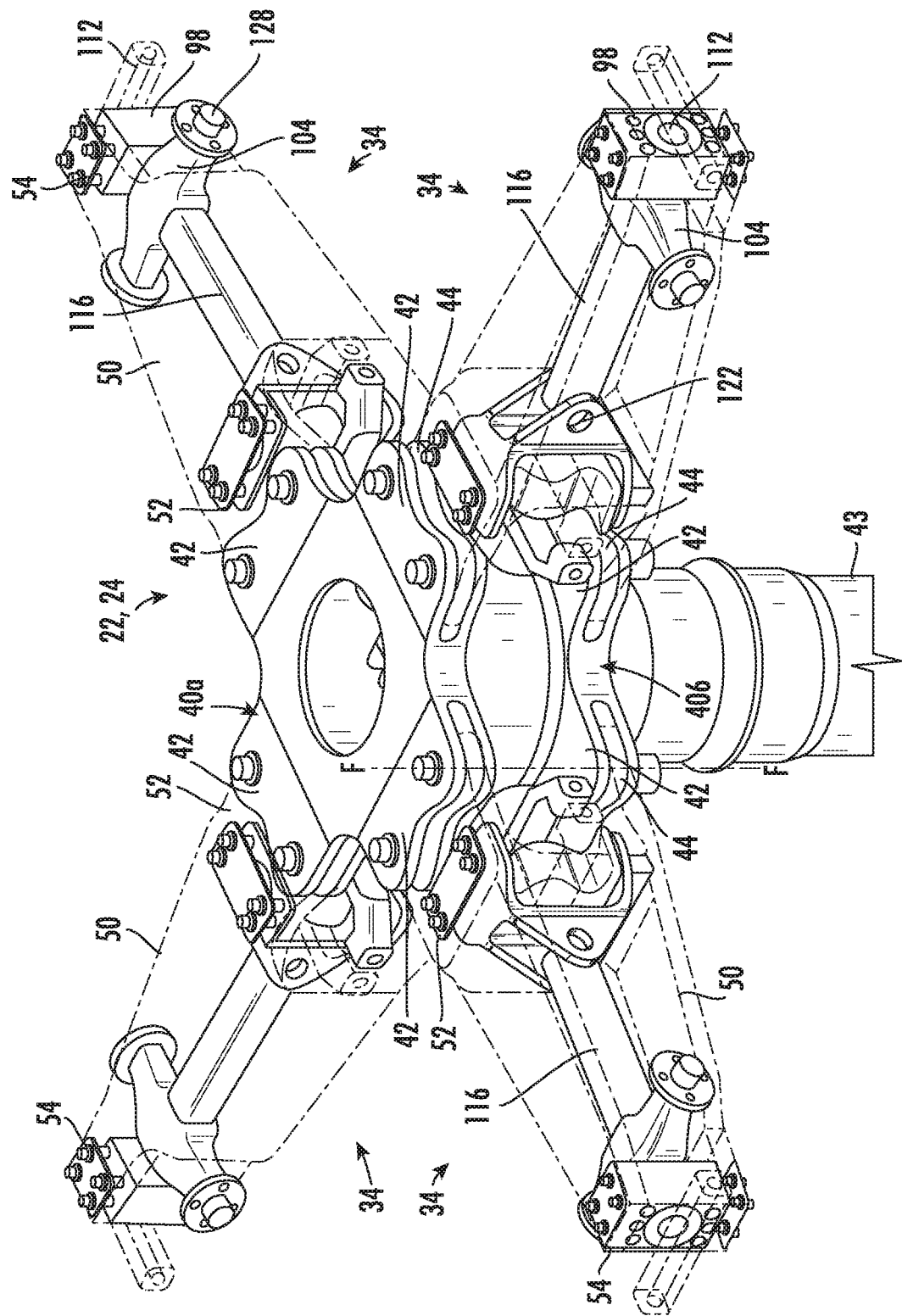
FIG. 5 is a perspective view of a portion of a rotor system in an in-flight position according to an embodiment.
Figure 6:
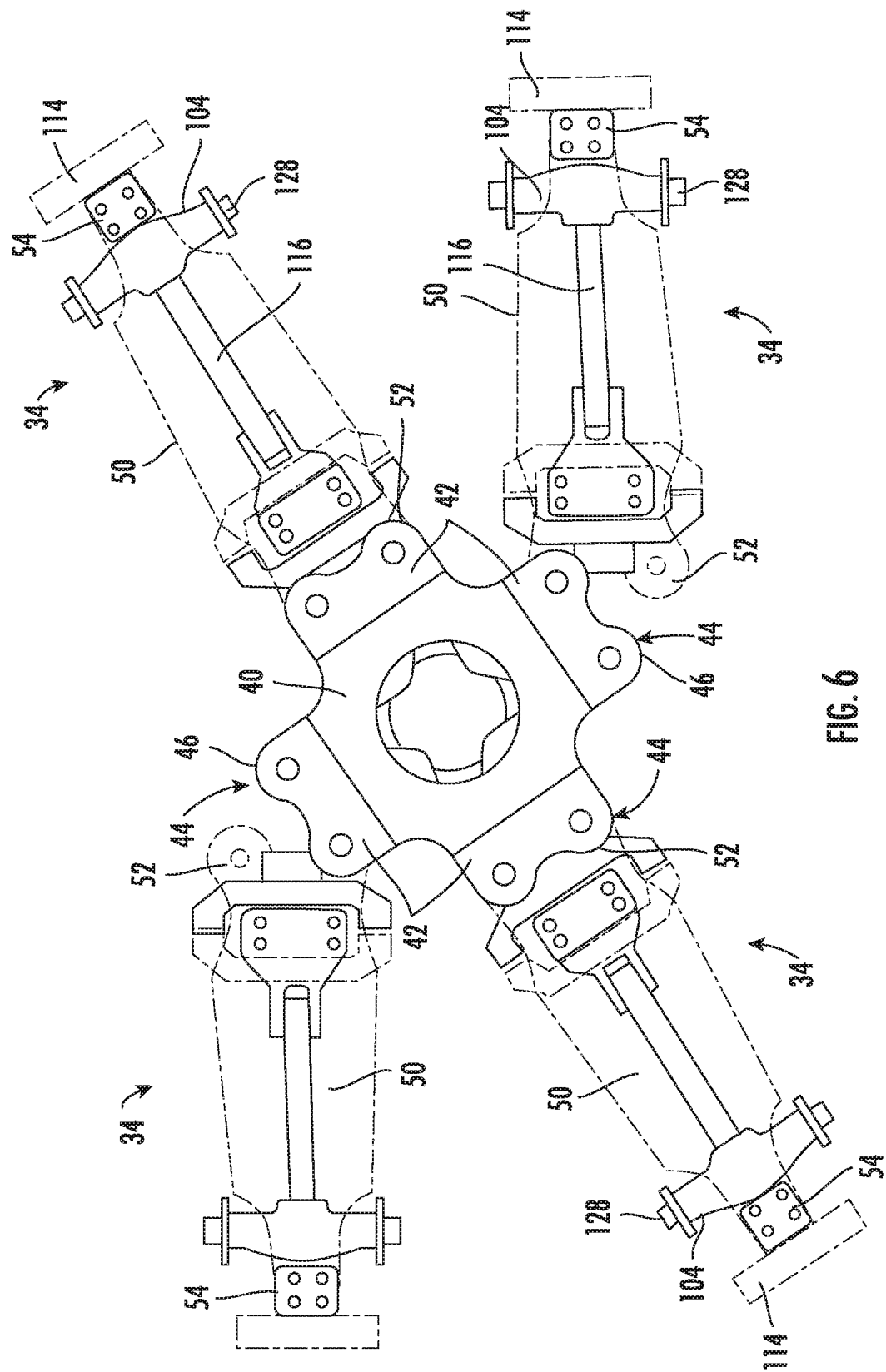
FIG. 6 is a perspective view of the portion of a rotor system of FIG. 5 in a stowed position according to an embodiment.
Figure 7:
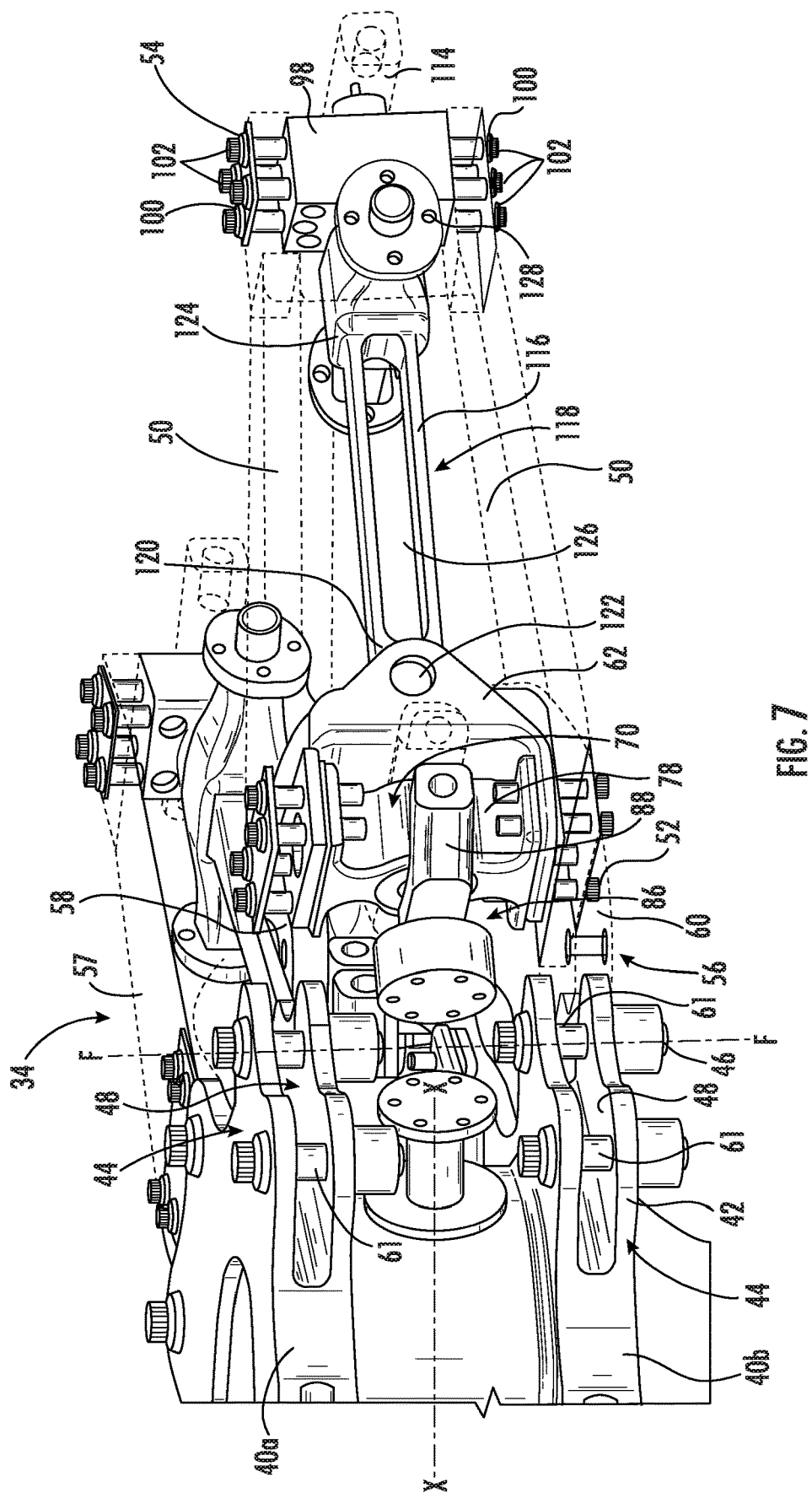
FIG. 7 is a perspective view of a blade attachment assembly of a rotor system in a partially stowed position according to an embodiment.
Figure 8:
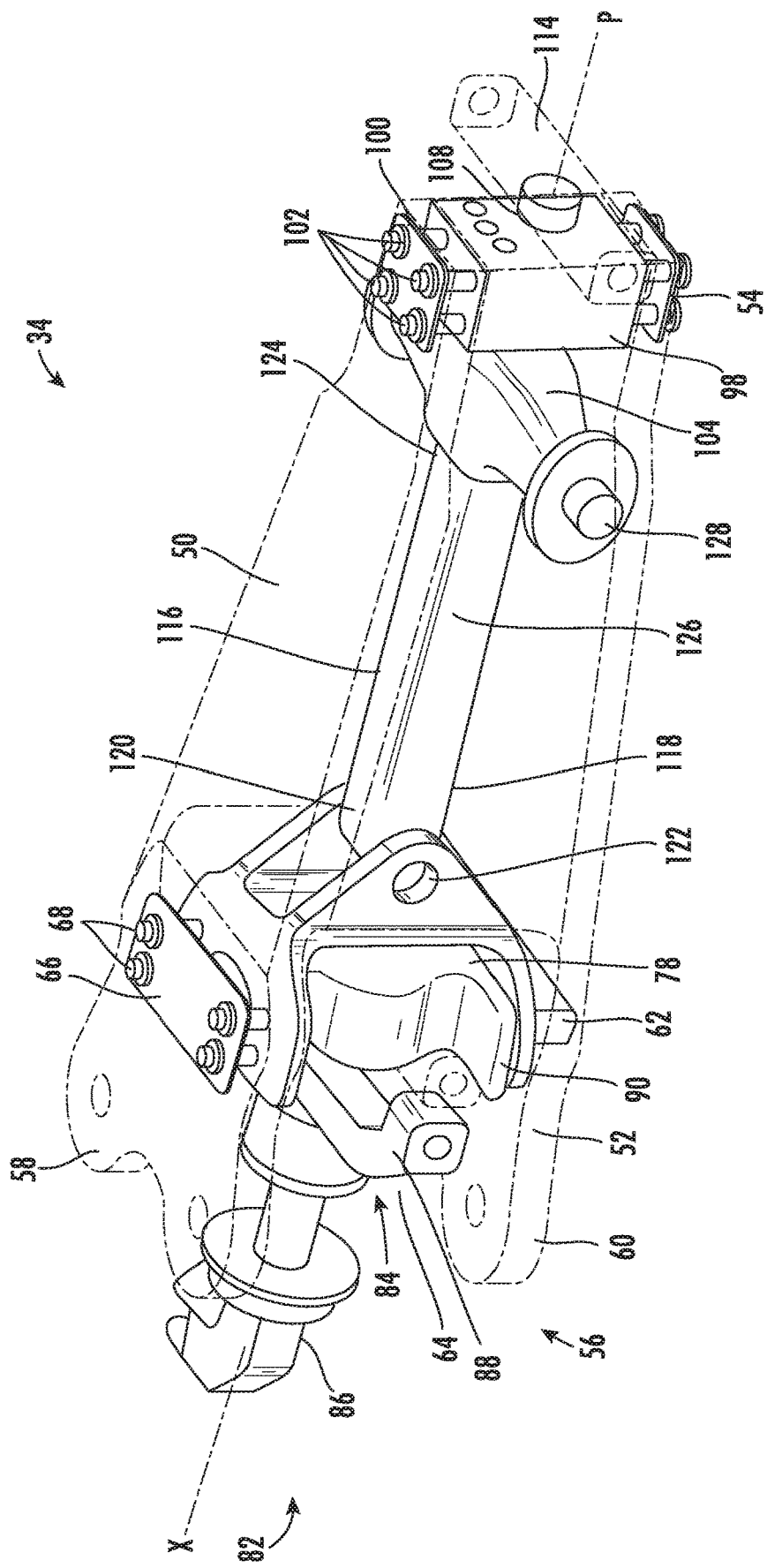
FIG. 8 is a perspective view of a blade attachment assembly of a rotor system according to an embodiment.

As best shown in FIG. 5, a rotor hub assembly, such as either the upper hub assembly 22 or the lower hub assembly 24 for example, is illustrated in more detail. As shown, the rotor hub assembly 22, 24 includes at least one plate 40 mounted to a shaft 43 of the rotor system 12. In the illustrated, non-limiting embodiment, the rotor hub assembly 22, 24 includes an upper plate 40a arranged adjacent a first end of the hub assembly 22, 24 and a lower plate 40b arranged adjacent a second, opposite end of the rotor hub assembly 22, 24. However, embodiments where the rotor hub assembly 22, 24 includes only one of the upper plate 40a and lower plate 40b are also within the scope of the disclosure. The one or more plates 40a, 40b of the rotor hub assembly 22, 24 include a plurality of hub arms 42 extending radially outwardly from the rotor axis A. A configuration of each of the plurality of hub arms 42 may be substantially identical, or alternatively, may vary.

A rotor blade assembly 20 is mountable to each of the plurality of hub arms 42. In the illustrated embodiment, each of the plurality of hub arms 42 includes a blade clevis 44 is located at the distal end 46 of each hub arm 42. In such embodiments, a portion of the rotor blade assembly 20 is received within the central opening 48 of the blade clevis 44. Further, in embodiments where the rotor hub assembly 22, 24 includes an upper plate 40a and a lower plate 40b, each hub arm 42 and blade clevis 44 of the upper plate 40a may be aligned with a hub arm 42 and blade clevis 44 of the lower plate. However, embodiments where the hub arms 42 or blade clevises 44 are vertically offset relative to one another about the axis A are also contemplated herein.

One or more of the rotor blade assemblies 20 includes a blade attachment assembly 34 for mounting the rotor blade assembly 20 to the rotor hub assembly 22, 24 such that the rotor blade assembly 20 is configured to fold about a blade fold axis F arranged generally perpendicular to the blade chord. With reference now to FIGS. 5-9, an example of a blade attachment assembly 34 is illustrated in more detail according to an embodiment. As shown, the blade attachment assembly 34 includes a rigid hub extender 50 having a first, inboard end 52 and a second, outboard end 54. The first end 52 of the hub extender 50 is configured to mount to the rotor hub assembly 22, 24.

A clevis 56 having at least one of an upper portion 58 and a lower portion 60 (best shown in FIG. 7) may be formed at the inboard end 52 of the hub extender 50. In the illustrated, non-limiting embodiment, the upper portion 58 is receivable within the opening 48 of a blade clevis 44 of a hub arm 42 of the upper plate 40a and the lower portion 60 is receivable within the opening 48 of a corresponding blade clevis 44 of a hub arm 42 of the lower plate 40b. In an embodiment, a plurality of aligned openings are formed in the upper and lower portions 58, 60 of the clevis 56 and the upper and lower plates 40a, 40b of the rotor hub assembly 22, 24. Accordingly, a pin 61 extends through each set of aligned openings to couple the hub extender 50 to the rotor hub assembly 22, 24 and define a blade fold axis F.

The hub extender 50 may be formed from any suitable material, including but not limited to a composite material, steel, and titanium for example. In the illustrated, non-limiting embodiment, the hub extender 50 has a generally rectangular cross-section that varies in size over the pitch axis of rotor blade assembly, for example the cross-sectional area may gradually reduce along the longitudinal axis of the rotor blade assembly 20, extending from the inboard end 52 to the outboard end 54. However, it should be understood that a hub extender having a cross-section of any shape or configuration is within the scope of the disclosure.

Figure 9:
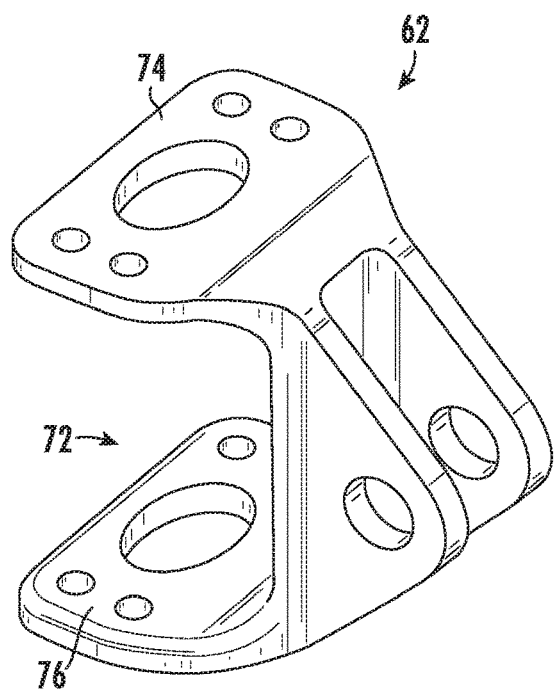
FIG. 9 is a perspective view of an anchor of a blade attachment assembly according to an embodiment.
Figure 10:
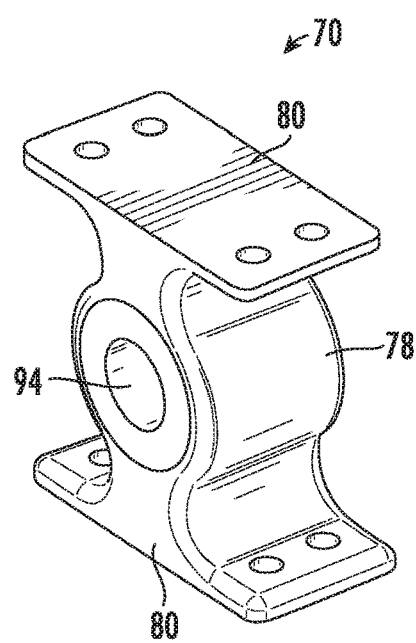
FIG. 10 is a perspective view of an inboard bearing of a blade attachment assembly according to an embodiment.
Figure 11:
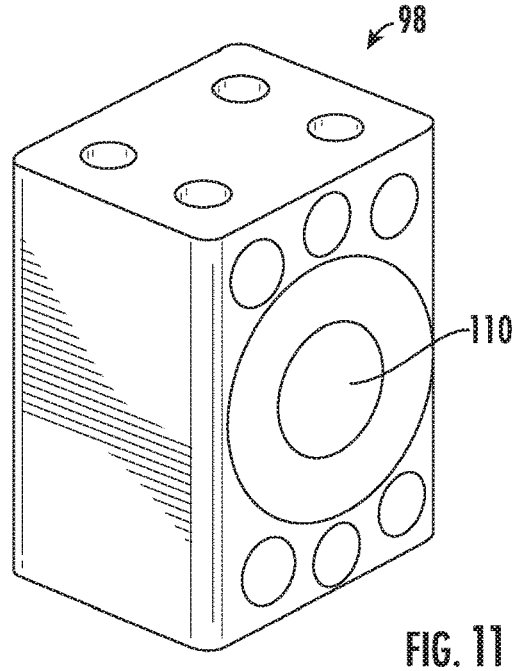
FIG. 11 is a perspective view of an outboard bearing of a blade attachment assembly according to an embodiment.
Figure 13A:
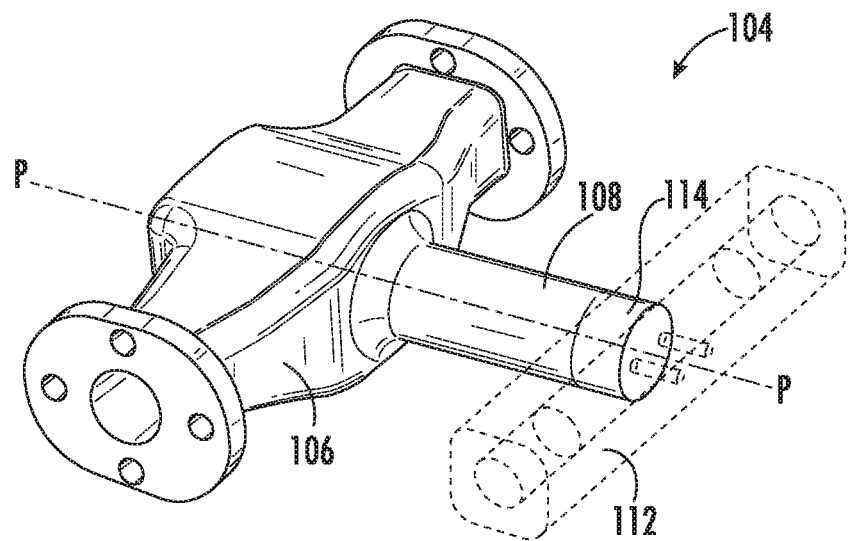
FIGS. 13A and 13B are various perspective views of an outboard bearing assembly of a blade attachment assembly according to an embodiment.
Figure 13B:
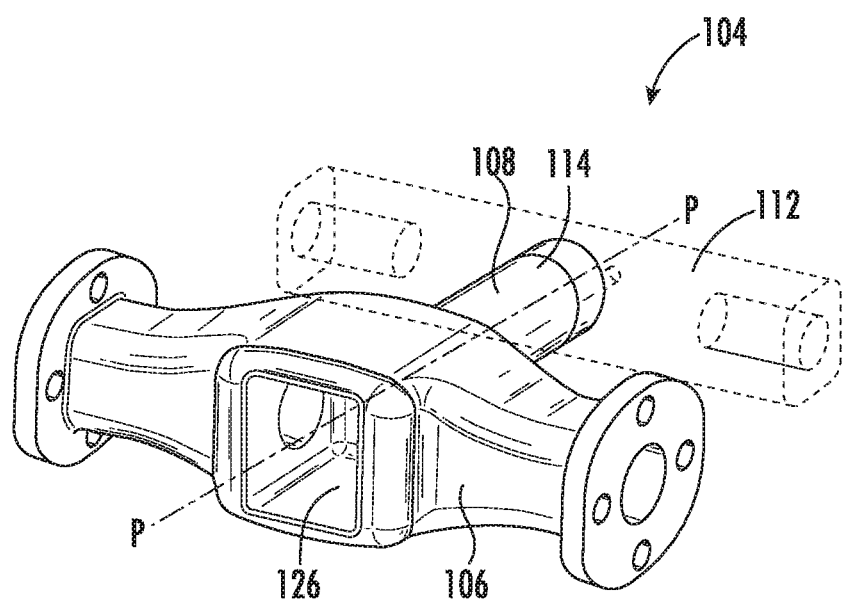

A clevis-shaped anchor or mounting bracket 62, best shown in FIG. 9, is disposed within the interior 64 of the hub extender 50 adjacent the first inboard end 52 thereof. In the illustrated, non-limiting embodiment, the anchor 62 is affixed to the hub extender 50 via one or more clamping plates 66 positioned adjacent an exterior of the hub extender 50 and/or a plurality of fasteners 68. However, it should be understood that embodiments where the clamping plate and/or fasteners are located within the interior of the hub extender are also within the scope of the disclosure. Further, embodiments where the anchor 62 is mounted to the hub extender 50 via any other suitable mechanism are also contemplated herein.

An inboard bearing 70 is positioned within the clearance 72 defined between a first arm 74 and the second arm 76 of the anchor 62. As shown, the inboard bearing 70 may include a body 78 and a flange 80 extending perpendicularly to the body 78 at the first and second ends thereof, respectively, such that the inboard bearing 70 has an I-like configuration. Each of flanges 80 may abut the first arm 74 and the second arm 76 of the anchor 62, respectively and is coupled to the anchor 62 and the hub extender 50 via the plurality of fasteners 68. The blade folding axis F defined by the pin 61, is located inboard of the anchor 62 and the inboard bearing 70.

A pitch control assembly 82 includes a blade pitch control coupling 84 mounted for rotation with the torque tube 32 about a blade pith axis P. A horn spindle coupling 86 is rotationally mounted to the rotor hub assembly 22, 24 for rotation about a hub spindle pitch axis X. The hub spindle pitch axis X is in line with the pitch axis P when the rotor blade assembly 20 is in the flight position. The blade pitch control coupling 84 rotationally engages the horn spindle coupling 86 at an interface when the blade attachment assembly 34 is in the flight position. The interface may, but need not include a toothed interlock to rotationally lock the blade pitch control coupling 84 with the horn spindle coupling 86 such that an input to the horn spindle coupling 86 is transmitted to the blade pitch control coupling 84, the torque tube 32, and the attached rotor blade 30.

In an embodiment, the blade pitch control coupling 84 is coupled to the inboard bearing 70. As shown, the blade pitch control coupling 84 includes a first portion 88 and a second portion 90. The first portion 88 has a C-like shape that surrounds a first side of the inboard bearing 70. In the illustrated, non-limiting embodiment, a connector 92 extends perpendicularly from the first portion coaxial with the blade pitch axis P. The connector 92 is receivable within a central opening 94 formed in the body 78 of the inboard bearing 70. The second portion 90 of the blade pitch control coupling 84 is connectable to the distal or free end 96 of the connector 92 extending beyond the adjacent inboard bearing 70.

Because the first and second portions 88, 90 of the blade pitch control coupling 84 are disposed on opposing sides of the inboard bearing 70, translation of the blade pitch control coupling 84 relative to the inboard bearing 70 and the hub extender 50 is restricted. However, the blade pitch control coupling 84 is rotatable about the pitch axis relative to the inboard bearing 70 and the hub extender 50. The end points of the allowable rotation are defined by engagement between the blade pitch control coupling 84 and an adjacent wall of the hub extender 50. As shown, the blade folding axis F defined by the pin 61, is also located inboard of the blade pitch control coupling 84.

An outboard bearing 98 is similarly disposed within the hub extender 50 adjacent the distal or outboard end 54 thereof. In the illustrated, non-limiting embodiment, the outboard bearing 98 is affixed to the hub extender 50 via one or more clamping plates 100 positioned adjacent a surface of the hub extender 50 and/or a plurality of fasteners 102. The blade attachment assembly 34 additionally includes an outboard bearing bracket 104 arranged generally inboard of the outboard bearing 98. As shown, the outboard bearing bracket 104 includes a body 106 oriented generally perpendicular to the pitch axis P of the rotor blade assembly 20. In an embodiment, the body 106 is sized such that at least one of the ends thereof, and in the illustrated embodiments, opposing ends of the body 106 are located external to the hub extender 50.

Extending perpendicularly from an outboard side of the body 106, generally coaxial with the pitch axis P of the rotor blade assembly 20, is a connector 108. As shown, the connector 108 may be cylindrical in shape. However, it should be understood that a connector 108 having any configuration is within the scope of the disclosure. The connector 108 is receivable within a central opening 110 formed in the outboard bearing 98. An affixing member 112 is coupled to a free end 114 of the connector 108 extending beyond the outboard bearing 98, such as with one or more fasteners for example.

Because the affixing member 112 and the body 106 of the outboard bearing bracket 104 are disposed on opposing sides of the outboard bearing 98, translation of the outboard bearing bracket 104 away from the outboard bearing 98 is restricted. However, the outboard bearing bracket 104 is rotatable about the pitch axis relative to the outboard bearing 98 and the hub extender 50. The end points of the allowable rotation are defined by engagement between the body of the outboard bearing bracket 104 and a wall of the hub extender 50.

The rotor blade assembly 20 additionally includes a tension torsion strap 116 having an elongate body 118 with arcuate or curved opposing ends 120, 122. The tension torsion strap 116 may be formed of any suitable material, such as steel or Kevlar™ for example. An opening 124 may be located at a center of the elongate body 118 to reduce the material, and therefore weight, of the tension torsion strap 116. A fibrous material may extend along the elongate body 118 parallel to the longitudinal axis of the elongate body 118. The tension torsion strap 116 is arranged within the interior 64 of the hub extender 50. In the illustrated, non-limiting embodiment, the tension torsion strap 116 is positioned such that an axis defined by the opening 124 is oriented horizontally, in a substantially perpendicular configuration relative to the pitch axis P of the rotor blade assembly 20 and the hub extender 50.

In the illustrated, non-limiting embodiment, a first end 120 of the tension torsion strap 116 is connected to a portion of the anchor 62, such as via a pin or other suitable fastener 122. Similarly, a second, opposite end 124 of the tension torsion strap 116 is received within an opening 126 formed in the outboard bearing bracket 104. In an embodiment, a pin or other fastener 128 extending through the body 118 of the outboard bearing bracket 104 couples the tension torsion strap 116 to the outboard bearing bracket 104. As a result of this configuration, translational movement of the tension torsion strap 116 along the pitch axis P is restricted by the anchor 62 and outboard bearing bracket 104.

The blade attachment assembly 34 illustrated and described provides high stiffness in lead/lag, flap, and torsion directions. The blade attachment assembly 34 additionally minimizes the misalignment between the inboard and outboard bearings. The bolt 61 allows the blade to fold at its inboard end, while the outboard end of the attachment is carried effectively as in plane shear. The blade attachment assembly 34 further reduces the height and drag of the rotor blade.

With reference again to FIG. 4, as shown, one or more openings may be formed in the rotor hub fairing, such as fairing Fu or $F_L$ for example, to accommodate the folding motion of one or more rotor blade assemblies coupled thereto. The arcuate shaped openings or cut away sections avoid interference with the rotor blade assemblies as they pivot about the blade fold axis. In the illustrated, non-limiting embodiment, the rotor hub assembly 22, 24 has four rotor blade assemblies 30, and two opposing rotor blade assemblies 30

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotor blade attachment assembly for use with a rotor hub to which a rotor blade assembly is connected, the rotor blade attachment assembly comprising:
   a hub extender having an inboard end and an outboard end, wherein the inboard end of the hub extender is configured to form a connection with the rotor hub, wherein a blade fold axis about which the rotor blade rotates relative to the rotor hub is defined at the connection;
   an inboard bearing mounted within an interior of the hub extender adjacent the inboard end;
   an outboard bearing mounted within an interior of the hub extender adjacent the outboard end;
   a tension torsion strap operably coupled to the inboard bearing and the outboard bearing;
   an anchor located within the interior of the hub extender, the anchor being coupled to the tension torsion strap at a pin connection disposed at a first end of the tension torsion strap; and
   a pitch control coupling coupled to the inboard bearing, wherein the pitch control coupling includes a first portion having a C-like shape, the first portion configured to surround a first side of the inboard bearing.

2. The rotor blade attachment assembly of claim 1, wherein the inboard end includes a clevis having an upper portion and a lower portion, the connection being formed at both the upper portion and the lower portion.

3. The rotor blade attachment assembly of claim 1, wherein at least one of the inboard bearing and the outboard bearing is an elastomeric bearing.

4. The rotor blade attachment assembly of claim 1, wherein the hub extender is formed from a composite material.

5. The rotor blade attachment assembly of claim 1, wherein a cross-sectional area of the hub extender reduces over a length of the hub extender.

6. The rotor blade attachment assembly of claim 1, wherein the pitch control coupling is rotatable about a pitch axis.

7. The rotor blade attachment assembly of claim 1, wherein the blade fold axis is located inboard of the inboard bearing.

8. The rotor blade attachment assembly of claim 1, wherein the anchor couples the inboard bearing to a first end of the tension torsion strap.

9. The rotor blade attachment assembly of claim 1, further comprising an outboard bearing bracket located at least partially within the interior of the hub extender, the outboard bearing bracket coupling the outboard bearing to a second end of the tension torsion strap.

10. A rotor assembly comprising:
    a rotor hub rotatable about an axis;

a plurality of rotor blade assemblies connected to the rotor hub, wherein the plurality of rotor blade assemblies include a torque tube and at least one of the plurality of rotor blade assemblies includes a blade attachment assembly, the blade attachment assembly including:

a rigid hub extender having configured to form a connection with the rotor hub, wherein a blade fold axis of the rotor blade assembly is defined at the connection;

at least one bearing mounted within an interior of the hub extender, the at least one bearing including an inboard bearing mounted adjacent an inboard end of the hub extender;

a tension torsion strap mounted within the interior of the hub extender, the tension torsion strap being rotatable about a pitch axis of the at least one rotor blade assembly and being translationally fixed relative to the pitch axis of the at least one rotor blade assembly;

an anchor located within the interior of the hub extender, the anchor being coupled to the tension torsion strap at a pin connection disposed at a first end of the tension torsion strap; and a pitch control coupling mounted to the torque tube, wherein the pitch control coupling includes a first portion having a C-like shape, the first portion configured to surround a first side of an inboard bearing.

11. The rotor hub assembly of claim 10, wherein the rotor hub further comprises a plurality of hub arms and the connection is formable between an inboard end of the hub extender and one of the plurality of hub arms.

12. The rotor hub assembly of claim 11, wherein the plurality of hub arms includes at least one hub arm having a clevis including an opening, and a portion of the inboard end of the hub extender is receivable within the opening.

13. The rotor hub assembly of claim 11, further comprising a hub fairing mounted to the rotor hub.

14. The rotor hub assembly of claim 13, wherein the hub fairing includes a cut out adjacent the at least one of the plurality of rotor blade assemblies that is foldable about the blade fold axis.

15. The rotor blade assembly of claim 10, wherein the blade attachment assembly further comprises a pitch control assembly rotatable about the pitch axis.

16. The rotor blade assembly of claim 15, wherein the pitch control assembly is operable to rotate the torque tube about the pitch axis.

17. The rotor blade assembly of claim 16, wherein the pitch control assembly further comprises:

a horn spindle coupling rotationally mounted to the rotor hub; and the pitch control coupling, wherein the pitch control coupling rotationally engages the horn spindle coupling when the blade attachment assembly is in the flight position.

18. The rotor blade assembly of claim 17, wherein an interface between the pitch control coupling and the horn spindle coupling includes a toothed interlock that rotationally locks the pitch control coupling to the horn spindle coupling.

19. The rotor blade assembly of claim 10, wherein the at least one bearing further includes an outboard bearing mounted adjacent an outboard end of the hub extender, and the tension torsion strap.

* * * * *